United States Patent
Morita et al.

(10) Patent No.: US 12,164,127 B2
(45) Date of Patent: Dec. 10, 2024

(54) RADIO WAVE TRANSMISSIVE SUBSTRATE

(71) Applicants: AGC Inc., Tokyo (JP); AGC FLAT GLASS NORTH AMERICA, INC., Alpharetta, GA (US)

(72) Inventors: Shimpei Morita, Tokyo (JP); Kouichirou Takahashi, Tokyo (JP); Osamu Kagaya, Tokyo (JP); Takato Kajihara, Tokyo (JP); Akiyo Nogami, Tokyo (JP)

(73) Assignees: AGC Inc., Tokyo (JP); AGC FLAT GLASS NORTH AMERICA, INC., Alpharetta, GA (US)

( * ) Notice: Subject to any disclaimer, the term of this patent is extended or adjusted under 35 U.S.C. 154(b) by 401 days.

(21) Appl. No.: 17/191,915

(22) Filed: Mar. 4, 2021

(65) Prior Publication Data

US 2021/0191011 A1  Jun. 24, 2021

Related U.S. Application Data

(63) Continuation of application No. PCT/JP2019/035699, filed on Sep. 11, 2019.

(30) Foreign Application Priority Data

Sep. 14, 2018 (JP) ................................ 2018-172749
Oct. 26, 2018 (JP) ................................ 2018-202102

(51) Int. Cl.
- *G02B 5/20* (2006.01)
- *C03C 17/36* (2006.01)
- *G02B 5/26* (2006.01)

(52) U.S. Cl.
CPC .......... *G02B 5/208* (2013.01); *C03C 17/3644* (2013.01); *G02B 5/26* (2013.01)

(58) Field of Classification Search
CPC .... G02B 5/208; G02B 5/26; B32B 17/10036; B32B 17/10192; B32B 17/10211;
(Continued)

(56) References Cited

U.S. PATENT DOCUMENTS

| 5,364,685 A | 11/1994 | Nakashima et al. |
| 6,195,034 B1 | 2/2001 | Tsuno et al. |

(Continued)

FOREIGN PATENT DOCUMENTS

| EP | 0 531 734 A1 | 3/1993 |
| JP | 07-242441 A | 9/1995 |

(Continued)

OTHER PUBLICATIONS

Translation to English for JP2015-205795 A via espacenet. accessed Nov. 8, 2022 (Year: 2015).*

(Continued)

*Primary Examiner* — Nancy R Johnson
(74) *Attorney, Agent, or Firm* — Oblon, McClelland, Maier & Neustadt, L.L.P.

(57) ABSTRACT

A radio-wave transmitting substrate includes a dielectric substrate, and, on at least one main surface of the dielectric substrate, a heat-ray reflection film including an electroconductive film, and an opening where the electroconductive film is absent in a plan view. At least a part of the at least one main surface in a plan view is a radio-wave transmitting region. The radio-wave transmitting region is a region where every 1-cm square unit region in the region satisfies the following expression (a): $L > 802.6 \times S - 503.7$. L is an overall length (unit: $mm/cm^2$) of a boundary between the heat-ray reflection film and the opening in the unit region, and S is a proportion of an area occupied by the heat-ray reflection film in the unit region.

21 Claims, 3 Drawing Sheets

(58) Field of Classification Search
CPC ..... C03C 3/087; C03C 17/3644; C03C 17/36; C03C 17/3652
See application file for complete search history.

(56) References Cited

U.S. PATENT DOCUMENTS

| | | | |
|---|---|---|---|
| 9,738,559 | B2 | 8/2017 | Matsunami et al. |
| 2001/0005184 | A1 | 6/2001 | Tsuno et al. |
| 2017/0029316 | A1* | 2/2017 | Shimada ................. C03C 4/082 |
| 2021/0129495 | A1* | 5/2021 | Asai ........................ B60J 1/002 |

FOREIGN PATENT DOCUMENTS

| | | | | |
|---|---|---|---|---|
| JP | 2006-327381 | A | 12/2006 | |
| JP | 2013-006713 | A | 1/2013 | |
| JP | 2013-228698 | A | 11/2013 | |
| JP | 2015-003388 | A | 1/2015 | |
| JP | 2015-205795 | A | 11/2015 | |
| JP | 2017-056588 | A | 3/2017 | |
| JP | 2017-181911 | A | 10/2017 | |
| JP | 2018-097064 | A | 6/2018 | |
| JP | 2018-112707 | A | 7/2018 | |
| WO | WO 2014/109368 | A1 | 7/2014 | |
| WO | WO-2015025963 | A1 * | 2/2015 | ............ B32B 15/08 |

OTHER PUBLICATIONS

Translation to English for JP 2017-181911 A via espacenet. accessed Nov. 8, 2022 (Year: 2017).*
Translation to English for WO2015025963 A1 via espacenet. accessed Feb. 24, 2023 (Year: 2015).*
International Search Report issued Nov. 5, 2019 in PCT/JP2019/035699 filed on Sep. 11, 2019, citing documents AN-AT therein, 2 pages.
Extended European Search Report issued May 6, 2022 in European Patent Application 19860715.2, citing documents AA-AC, AO and AP therein, 9 pages.

* cited by examiner

RADIO WAVE TRANSMISSIVE SUBSTRATE

TECHNICAL FIELD

The present invention relates to a radio-wave transmitting substrate.

BACKGROUND ART

In recent years, it is a common practice to reduce electric-power consumption, for example, by moderately using air conditioners or the like for cooling, in order to prevent the global warming. An attempt is being made accordingly to impart the function of reflecting infrared rays (heat rays) to the windows of vehicles, buildings, etc. to thereby reduce the intake of heat from sunlight to the inside of the vehicles or buildings.

Examples of methods for imparting the function of reflecting infrared rays to windows or the like include a method in which a thin film including a metal having an infrared-reflecting function, e.g., silver, is formed on a substrate, e.g., a glass.

For example, Patent Document 1 discloses a multilayered glass structure including a glass sheet and a heat-ray reflection film disposed on one main surface of the glass sheet, the heat-ray reflection film including a metal layer including silver as a main component.

CITATION LIST

Patent Literature

Patent Document 1: JP-A-2015-3388

SUMMARY OF INVENTION

Technical Problem

In the case where such a substrate having an infrared-reflecting function is used, for example, as a window glass, the substrate is required to further have high transparency to radio waves having given frequencies. Conventional substrates having an infrared-reflecting function have high transparency to the radio waves used in conventional communication which have relatively low frequencies, and have hence posed no particular problem concerning transparency. However, a problem has arisen in that the transparency to radio waves having frequencies in a range of several hundred megahertz to tens of gigahertz, such as radio waves for use in recent four-generation mobile communication systems (hereinafter referred to as 4G) or five-generation mobile communication systems (hereinafter referred to as 5G), is not sufficient as compared with the transparency to radio waves having frequencies in conventional ranges.

In view of these circumstances, an object of the present invention is to provide a radio-wave transmitting substrate having excellent transparency also to radio waves having frequencies of about several hundred megahertz to tens of gigahertz for use in 4G or 5G.

Solution to the Problem

The radio-wave transmitting substrate of the present invention, which eliminates the problem, includes a dielectric substrate, and, on at least one main surface of the dielectric substrate, a heat-ray reflection film including an electroconductive film, and an opening where the electroconductive film is absent in a plan view, wherein at least a part of the at least one main surface in a plan view is a radio-wave transmitting region, and wherein the radio-wave transmitting region is a region where every 1-cm square unit region in the region satisfies the following expression (a):

$$L > 802.6 \times S - 503.7 \quad (a).$$

(In expression (a), L is an overall length (unit: mm/cm$^2$) of a boundary between the heat-ray reflection film and the opening in the unit region, and S is a proportion of an area occupied by the heat-ray reflection film in the unit region.)

In one embodiment of the present invention, the radio-wave transmitting region may satisfy the following expression (b):

$$Z > (-Z' + Z' \times S' + 0.3)/S' \quad (b).$$

(In expression (B), Z is a solar reflectance of the heat-ray reflection film, Z' is a solar reflectance of the opening, and S' is a proportion of the area of the heat-ray reflection film to an area of the radio-wave transmitting region.)

In one embodiment of the present invention, the radio-wave transmitting region may satisfy the following expression (c):

$$\Delta E < 60.3 \times D^{-0.62} \quad (c).$$

(In expression (c), $\Delta E$ is a color difference between the heat-ray reflection film and the opening, and D is a width (unit: mm) of the opening.)

In one embodiment of the present invention, the radio-wave transmitting region may have a radio-wave transmission loss of 3 dB or less in transmitting radio waves having a frequency of 28 GHz.

In one embodiment of the present invention, the openings may be a plurality of parallel lines or a lattice pattern.

In one embodiment of the present invention, the radio-wave transmitting substrate may include a radio-wave non-transmitting region on at least a part of the at least one main surface of the dielectric substrate, wherein the radio-wave nontransmitting region is a region where every 1-cm square unit region including the radio-wave nontransmitting region satisfies the following expression (d):

$$L \leq 802.6 \times S - 503.7 \quad (d)$$

(In expression (d), L is an overall length (unit: mm/cm$^2$) of a boundary between the heat-ray reflection film and the opening in the unit region, and S is a proportion of the area occupied by the heat-ray reflection film in the unit region.)

In one embodiment of the present invention, the electroconductive film may include at least one selected from the group consisting of silver and aluminum, in a total amount of 50 at. % or larger.

In one embodiment of the present invention, the dielectric substrate may be exposed in the opening.

In one embodiment of the present invention, the dielectric substrate may have a radio-wave transmission loss of 4 dB or less in transmitting radio waves having a frequency of 28 GHz.

In one embodiment of the present invention, the electroconductive film may have a thickness of 1 nm to 100 nm.

In one embodiment of the present invention, the heat-ray reflection film may include at least one of a metal oxide layer and a metal nitride layer, the metal oxide layer and the metal nitride layer being different from the electroconductive film.

In one embodiment of the present invention, the electroconductive film may have a configuration in which the electroconductive film is sandwiched between layers including at least one of the metal oxide layer or the metal nitride layer.

In one embodiment of the present invention, the dielectric substrate may include a plurality of glass substrates, and the plurality of glass substrates are laminated to each other with a resin film interposed therebetween.

Advantageous Effect of Invention

According to the present invention, a radio-wave transmitting substrate having excellent transparency also to radio waves having frequencies of about several hundred megahertz to tens of gigahertz for use in 4G or 5G is provided.

DESCRIPTION OF EMBODIMENTS

Figure 1:
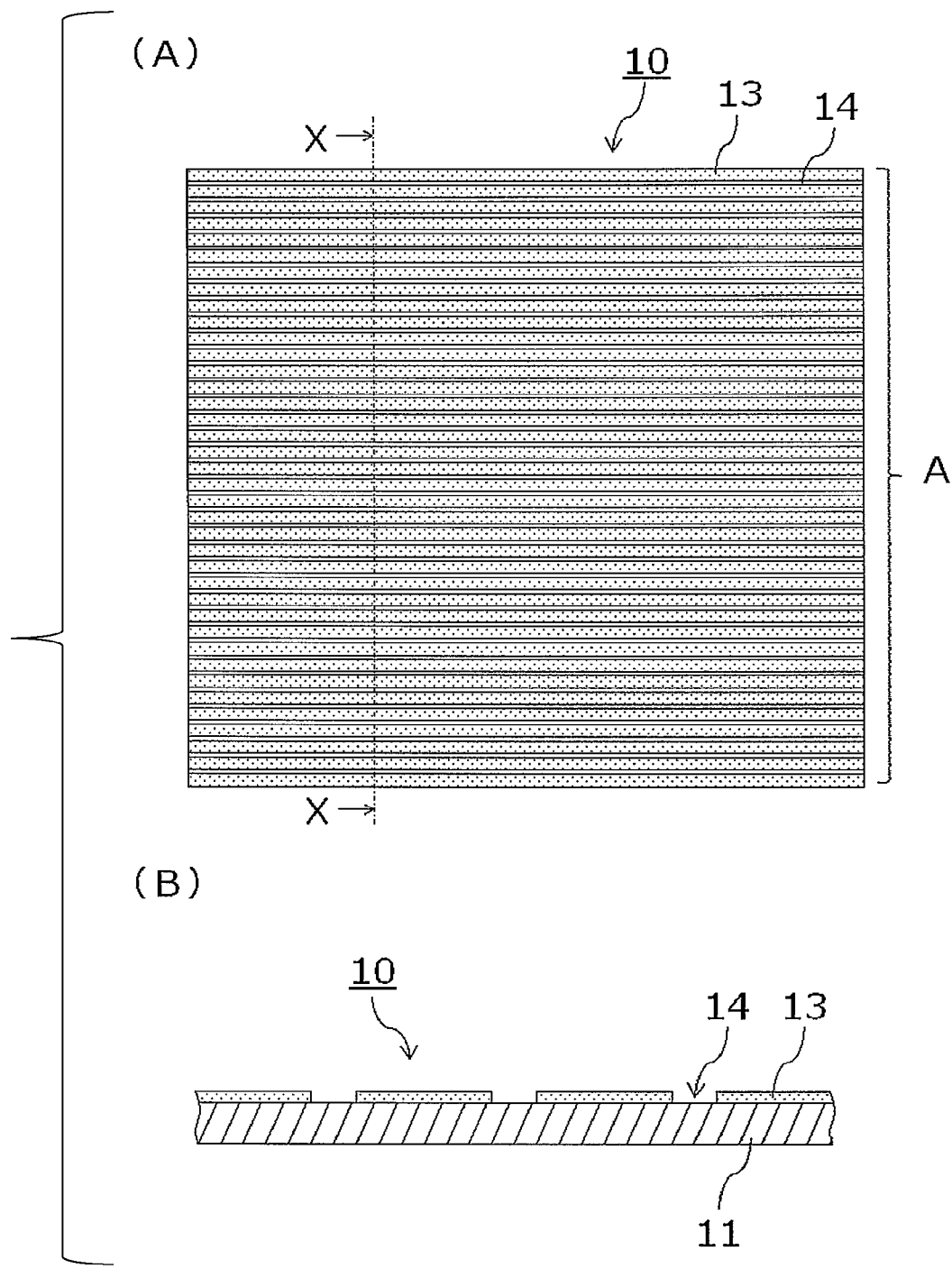
FIG. 1 illustrates one embodiment of the radio-wave transmitting substrate of the present invention. (A) is a top view and (B) is an enlarged view of a cross-sectional view taken on the line X-X of (A).

Embodiments of the present invention are explained in detail below. The present invention is not limited to the embodiments explained below. In the drawings, members or portions having like functions are often denoted by like numerals or signs. Duplications of explanation are often omitted or simplified. The embodiments shown in the drawings have been schematized in order to clearly explain the present invention and do not always accurately show sizes or scales in actual products.

FIG. 1 illustrates one embodiment of the radio-wave transmitting substrate of the present invention. (A) is a top view and (B) is an enlarged view of a cross-sectional view taken on the line X-X of (A).

The radio-wave transmitting substrate 10 according to this embodiment includes a dielectric substrate 11, and a heat-ray reflection film 13 on at least one main surface of the dielectric substrate 11 and has, on said at least one main surface, an opening 14 where the heat-ray reflection film 13 is absent in a plan view. In the radio-wave transmitting substrate 10 according to this embodiment, a plurality of the heat-ray reflection film 13 and the opening 14, which have been disposed adjacently in a plan view, constitute a radio-wave transmitting region. As stated later, the opening 14 does not have therein an electroconductive film included in the heat-ray reflection film 13.

The radio-wave transmitting region is a region where every 1-cm square unit region satisfies the following expression (a).

$$L > 802.6 \times S - 503.7 \quad (a)$$

(In expression (a), L is an overall length (unit: mm/cm$^2$) of a boundary between the heat-ray reflection film and the opening in the unit region and S is a proportion of the area occupied by the heat-ray reflection film in the unit region.)

The radio-wave transmitting substrate according to this embodiment, which has the configuration shown above, has excellent transparency also to radio waves having frequencies of about several hundred megahertz to tens of gigahertz. Features of the radio-wave transmitting substrate according to this embodiment are explained in detail below.

<Dielectric Substrate>

The dielectric substrate in this embodiment is not particularly limited so long as it is a substrate constituted of a dielectric. For example, use can be made of a glass substrate made of a soda-lime glass, an alkali-free glass, silica glass, etc. The glass substrate may have undergone a physical strengthening treatment or a chemical strengthening treatment. The glass substrate may be constituted of a single glass sheet or may be configured of a plurality of glass sheets laminated to each other, with a resinous film (resin film) or the like interposed therebetween.

The dielectric substrate in this embodiment is not limited to glass substrates, and may be, for example, a resinous substrate (resin substrate) or the like. Examples of the resin substrate include substrates constituted of acrylic resins, e.g., poly methyl methacrylate, aromatic polycarbonate resins, e.g., poly phenylene carbonate, and aromatic polyester resins, e.g., poly ethylene terephthalate (PET).

The shape of the dielectric substrate in this embodiment is also not particularly limited, and may be a flat shape or a curved shape. The thickness of the dielectric substrate in this embodiment is also not particularly limited, and can be suitably regulated in accordance with the desired strength, lightweight properties, etc.

Properties of the dielectric substrate in this embodiment, such as radio-wave transmitting properties and heat-ray reflecting properties, are also not particularly limited so long as the effect of the present invention is produced. Such properties may be regulated in accordance with the properties required of the radio-wave transmitting substrate to be finally obtained.

For example, the dielectric substrate in this embodiment has a radio-wave transmission loss, in transmitting 28-GHz radio waves, of preferably 4 dB or less, more preferably 3 dB or less, still more preferably 2 dB or less. The radio-wave transmission loss can be determined by the method which is described later in Examples.

In the case of using a glass substrate as the dielectric substrate in this embodiment, the configurations shown below are preferred. The content of each component in the glass substrate is represented by mole percentage based on oxides. That a glass "does not substantially contain" a certain component means that the component was not deliberately added, except for the case where the component has unavoidably come as an impurity into the glass.

The glass substrate preferably has a specific gravity of 2.4 or higher and 3.0 or less. The glass substrate preferably has a Young's modulus of 60 GPa or higher and 100 GPa or less. The glass substrate preferably has an average coefficient of thermal expansion at 50° C. to 350° C. of $50 \times 10^{-7}$/° C. to $120 \times 10^{-7}$/° C. In the case where the glass substrate satisfies these property requirements, this glass substrate is sufficiently suitable for use as a material for windows.

It is preferable that the glass substrate contains $SiO_2$ in an amount not less than a certain level from the standpoint of ensuring weatherability. As a result, the glass substrate can have a specific gravity of 2.4 or higher. The specific gravity of the glass substrate is more preferably 2.45 or higher. In the case where the specific gravity of the glass substrate is 3.0 or less, this glass substrate is less apt to be brittle and a reduction in weight is attained. The specific gravity of the glass substrate is more preferably 2.6 or less.

In the case where the glass substrate has a high Young's modulus, this glass substrate has rigidity and is more suitable for automotive window applications, etc. The Young's modulus of the glass substrate is preferably 65 GPa or higher, more preferably 70 GPa or higher, still more preferably 72 GPa or higher. Increasing the content of $SiO_2$ in order to heighten the Young's modulus of the glass substrate results in poor meltability. Appropriate Young's moduli are hence 100 GPa and less. The Young's modulus of the glass substrate is more preferably 85 GPa or less, still more preferably 78 GPa or less.

In the case where the glass substrate has a high average coefficient of linear expansion, this glass substrate can be physically strengthened and is more suitable for use in window applications. The average coefficient of linear expansion at 50° C. to 350° C. is more preferably $60 \times 10^{-7}/°$ C. or higher, still more preferably $80 \times 10^{-7}/°$ C. or higher. In the case where the glass substrate has too high an average coefficient of linear expansion, the glass sheet is prone to have thermal stress due to a temperature distribution therein in a forming step, annealing step, or physical strengthening step. This may cause a heat crack to the sheet. In addition, there is an increased difference in expansion between such glass substrate and metallic sashes or the like, and the expansion difference is causative of strains and may lead to cracking. The average coefficient of linear expansion at 50° C. to 350° C. is more preferably $110 \times 10^{-7}/°$ C. or less, still more preferably $98 \times 10^{-7}/°$ C. or less.

The glass substrate preferably has a $T_2$ of 1,750° C. or lower. The glass substrate preferably has a $T_4$ of 1,350° C. or lower. The $T_4$-$T_L$ of the glass substrate is preferably −50° C. or higher. It is more preferable that the glass substrate has a $T_2$ of 1,750° C. or lower, a $T_4$ of 1,350° C. or lower, and a $T_4$-$T_L$ of −50° C. or higher. In this description, $T_2$ indicates a temperature at which the glass has a viscosity of $10^2$ (dPa·s), $T_4$ indicates a temperature at which the glass has a viscosity of $10^4$ (dPa·s), and $T_L$ indicates the liquidus temperature of the glass.

In the case where the $T_2$ or the $T_4$ is higher than the given temperature, it is difficult to produce a large sheet by a float process, fusion process, rolling-out process, downdraw process, etc. The $T_2$ is more preferably 1,600° C. or lower, still more preferably 1,500° C. or lower. The $T_4$ is more preferably 1,350° C. or lower, still more preferably 1,200° C. or lower. There are no particular lower limits on the $T_2$ and $T_4$. However, from the standpoint of maintaining the weatherability and specific gravity of the glass, the $T_2$ is typically 1,200° C. or higher and the $T_4$ is typically 800° C. or higher. The $T_2$ is more preferably 1,300° C. or higher, still more preferably 1,400° C. or higher. The $T_4$ is more preferably 900° C. or higher, still more preferably 1,000° C. or higher.

From the standpoint of enabling the glass substrate to be produced by a float process, $T_4$-$T_L$ is preferably −50° C. or higher. In the case where the difference therebetween is lower than −50° C., the glass may devitrify during glass forming and this can pose problems in that the glass has reduced mechanical properties, reduced transparency, etc., making it impossible to obtain a glass of satisfactory quality. Such too low values of $T_4$-$T_L$ are hence undesirable. $T_4$-$T_L$, is more preferably 0° C. or higher, still more preferably 20° C. or higher.

The glass substrate preferably has a $T_g$ of 400° C. or higher and 750° C. or less. In this description, $T_g$ indicates the glass transition temperature of the glass. In the case where the $T_g$ is within the given temperature range, bending of this glass can be performed within a range of usual production conditions. In the case where the $T_g$ is lower than 400° C., this glass, although having a satisfactory formability, has too high an alkali content or too high an alkaline-earth content and is hence prone to arouse problems in that the glass shows excessive thermal expansion and has reduced weatherability, etc. There also is a possibility that this glass might devitrify at temperatures within a forming-temperature range, making the forming impossible. The $T_g$ is more preferably 450° C. or higher, still more preferably 480° C. or higher, especially preferably 520° C. or higher. In the case where the $T_g$ is too high, higher temperatures are necessary for bending the glass, making the production more difficult. The $T_g$ is more preferably 600° C. or lower, still more preferably 550° C. or lower.

The glass substrate can be made to have a reduced dielectric loss by regulating the glass composition, thereby attaining a high radio-wave transmittance. Likewise, the relative permittivity also can be regulated by regulating the composition, making it possible to attain relative permittivity according to applications.

The glass substrate preferably has a content of $SiO_2$ of 50% or higher and 80% or less. The glass substrate preferably has a content of $Al_2O_3$ of 0% or higher and 20% or less. $SiO_2$ and $Al_2O_3$ contribute to an improvement in Young's modulus, making it easy to ensure strength necessary in building applications, automotive window applications, etc. In the case where the content of $Al_2O_3$ and/or $SiO_2$ is too low, not only it is difficult to ensure weatherability but also the glass is prone to have too high an average coefficient of linear expansion and to suffer a heat crack. Such too low contents thereof are hence undesirable. In the case where the content of $Al_2O_3$ and/or $SiO_2$ is too high, this glass has increased melt viscosity, making the glass production difficult. Too high contents thereof also are hence undesirable. In addition, too high contents of $Al_2O_3$ may result in a decrease in radio-wave transmittance.

The content of $SiO_2$ is more preferably 65% or higher, still more preferably 70% or higher, especially preferably 72% or higher. The content of $SiO_2$ is more preferably 77% or less, still more preferably 75% or less.

The content of $Al_2O_3$ is preferably 0.1 or higher from the standpoint of improving the weatherability. From the standpoints of keeping the glass viscosity $T_2$ low to facilitate glass production and of heightening the radio-wave transmittance, the content of $Al_2O_3$ is more preferably 5% or less, still more preferably 1% or less, especially preferably 0.5% or less.

From the standpoint of heightening the radio-wave transmittance, it is preferable that $SiO_2+Al_2O_3$, i.e., the total content of $SiO_2$ and $Al_2O_3$, is 50% or higher and 80% or less. Also from the standpoint of keeping the glass viscosities $T_2$ and $T_4$ low to facilitate glass production, $SiO_2+Al_2O_3$ is desirably lower and hence is preferably 80% or less. $SiO_2+Al_2O_3$ is more preferably 76% or less, still more preferably 74% or less. However, in the case where $SiO_2+Al_2O_3$ is too low, the glass substrate might have reduced weatherability and too high an average coefficient of linear expansion. Because of this, $SiO_2+Al_2O_3$ is more preferably 65% or higher, still more preferably 72% or higher.

The glass substrate preferably has a content of $B_2O_3$ of 0% or higher and 15% or less. $B_2O_3$ can be incorporated in order to improve meltability and to improve the strength of the glass. $B_2O_3$ further has the effect of heightening the radio-wave transmittance. In the case where the content of $B_2O_3$ is too high, alkali elements might be prone to vaporize off during melting/forming, resulting in impaired glass quality. In the case where the content of $B_2O_3$ is too high, the glass has a reduced average coefficient of linear expansion and is difficult to physically strengthen. The content of $B_2O_3$ is more preferably 10% or less, still more preferably 3% or less, especially preferably substantially not contained.

The glass substrate preferably has a content of MgO of 0% or higher and 20% or less. MgO is a component which promotes the melting of raw materials for glass and improves the weatherability. The content of MgO is preferably 0.1% or higher. In the case where the content of MgO is 20% or less, this glass is less apt to devitrify. There are cases where MgO is effective also in heightening the radio-wave transmittance. The content of MgO is more preferably 4% or less, still more preferably 1% or less, especially preferably 0.2% or less.

CaO, SrO, and/or BaO can be contained in certain amounts in the glass substrate, in order to make the glass have a reduced dielectric loss. The content of CaO is preferably 0% or higher and 20% or less. The content of SrO is preferably 0% or higher and 15% or less. The content of BaO is preferably 0% or higher and 15% or less. In the case where the glass substrate contains CaO, SrO, and/or BaO, the glass can have improved meltability. The content of CaO is more preferably 3% or higher, and such CaO contents reduce the dielectric loss of the glass to improve the radio-wave transmittance. Furthermore, adding CaO in an amount of 3% or larger also brings about an improvement in glass meltability (a reduction in $T_2$ and a reduction in $T_4$). The content of CaO is more preferably 8% or higher, still more preferably 11% or higher. By regulating the content of CaO to 20% or less, the content of SrO to 15% or less, and the content of BaO to 15% or less, the glass is inhibited from increasing in specific gravity and is made to retain strength and low brittleness. From the standpoint of preventing the glass from being brittle, the content of CaO is more preferably 15% or less, still more preferably 12% or less. The content of SrO is more preferably 3% or less, still more preferably substantially not contained. The content of BaO is more preferably 3% or less, still more preferably substantially not contained.

In this description, "RO" represents the total content of MgO, CaO, SrO, and BaO. The glass substrate preferably has an RO of 0% or higher and 20% or less. In the case where the RO thereof is 20% or less, this glass substrate has improved weatherability. The RO of the glass substrate is more preferably 16% or less, still more preferably 13% or less.

From the standpoint of lowering the glass viscosities $T_2$ and $T_4$ during production or from the standpoint of heightening the Young's modulus, the RO of the glass substrate is preferably higher than 0%, more preferably 5% or higher, still more preferably 10% or higher.

From the standpoint of preventing the glass from devitrifying during glass melting or forming to result in a deterioration in glass quality, the total content of MgO and CaO (MgO+CaO) is preferably 0% or higher and 20% or less. MgO+CaO is more preferably 15% or less, still more preferably 13% or less. However, in the case where MgO+CaO is too low, the glass viscosity during melting or forming might be too high, making the production difficult. Because of this, MgO+CaO is more preferably 4% or higher, still more preferably 10% or higher.

The glass substrate preferably has a content of $Na_2O$ of 0% or higher and 18% or less. $Na_2O$ and $K_2O$ are components which improve the meltability of the glass, and it is more preferable that the glass substrate contains 0.1% or more $Na_2O$ and/or 0.1% or more $K_2O$. This makes it easy to regulate the $T_2$ to 1,750° C. or lower and the $T_4$ to 1,350° C. or lower. The incorporation of $Na_2O$ enables the glass to be chemically strengthened. The content of $Na_2O$ is more preferably 4% or higher, still more preferably 6% or higher.

In the case where the content of $Na_2O$ is too high, this glass substrate has too high an average coefficient of linear expansion and is prone to suffer a heat crack. The content of $Na_2O$ is more preferably 16% or less, still more preferably 10% or less, especially preferably 8% or less.

The glass substrate preferably has a content of $K_2O$ of 0% or higher and 18% or less. $K_2O$ is a component which improves the meltability of the glass, and it is more preferable that the glass substrate contains 0.1% or more $K_2O$. This makes it easy to regulate the $T_2$ to 1,750° C. or lower and the $T_4$ to 1,350° C. or lower. The content of $K_2O$ is more preferably 2% or higher, still more preferably 5% or higher.

In the case where the content of $K_2O$ is too high, this glass substrate has too high an average coefficient of linear expansion and is prone to suffer a heat crack. In the case where the content of $K_2O$ exceeds 18%, the glass substrate has reduced weatherability. Such too high $K_2O$ contents are hence undesirable. The content of $K_2O$ is more preferably 12% or less, still more preferably 8% or less.

In the case where the glass substrate contains both $Na_2O$ and $K_2O$, this glass substrate can have improved weatherability while retaining the meltability. The inclusion of both is hence preferred. The inclusion thereof is often effective also in heightening the ratio-wave transmittance. In the case where the content of $Na_2O$ and/or $K_2O$ is too low, this glass cannot have an increased average coefficient of linear expansion and cannot be thermally strengthened. By regulating the content of $Na_2O$ and/or $K_2O$ so as to be within the given range, the glass substrate is rendered usable as a material for windows which matches well with other members. From the standpoint of radio-wave transmittance, regulating the content thereof so as to be within that range makes it possible to obtain a high radio-wave transmittance.

The glass substrate preferably has a content of $Li_2O$ of 0% or higher and 18% or less. $Li_2O$ is a component which improves the meltability of the glass and makes it easy to heighten the Young's modulus to contribute to an improvement in the strength of the glass. The glass substrate containing $Li_2O$ can be chemically strengthened. The inclusion of $Li_2O$ is often effective also in heightening the radio-wave transmittance. In the case where $Li_2O$ is contained, the content thereof may be 0.1% or higher, or may be 1% or higher, or may be 3% or higher.

In the case where the content of $Li_2O$ is too high, devitrification or phase separation might occur during glass production, making the production difficult. The content of $Li_2O$ is more preferably 10% or less. $Li_2O$ might lower the coefficient of thermal expansion to make the glass unable to be physically strengthened. It is hence undesirable that the glass substrate for use as a glass for automotive windows has too high an $Li_2O$ content. Because of this, the content of $Li_2O$ is more preferably 7% or less, still more preferably 3% or less, especially preferably substantially not contained.

In this description, "$R_2O$" represents the sum of alkali metal oxides. Usually, "$R_2O$" means the total content of $Li_2O$, $Na_2O$, and $K_2O$. The $R_2O$ of the glass substrate is preferably 4% or higher and 20% or less. In the case where the $R_2O$ thereof is 20% or less, this glass substrate has improved weatherability. The $R_2O$ of the glass substrate is more preferably 18% or less, still more preferably 15% or less.

From the standpoint of lowering the glass viscosities $T_2$ and $T_4$ during production, the $R_2O$ thereof is preferably 4% or higher. The $R_2O$ thereof is more preferably 9% or higher, still more preferably 13% or higher, especially preferably 14% or higher.

The glass substrate preferably has a content of $ZrO_2$ of 0% or higher and 5% or less. $ZrO_2$ has the effect of lowering the melt viscosity of the glass to promote the melting and can contribute to improvements in heat resistance and chemical durability. In the case where the content of $ZrO_2$ is too high, the glass might have an elevated liquidus temperature and an increased average coefficient of linear expansion. The content of $ZrO_2$ is more preferably 1.0% or less, still more preferably not contained.

The glass substrate preferably has a content of $Fe_2O_3$ of 0.001% or higher and 5% or less. In the case where the content of $Fe_2O_3$ is less than 0.001%, not only this glass substrate might be unable to be used in applications where heat-shielding properties are required but also it is necessary that expensive raw materials having a low iron content should be used for producing the glass sheet. Such too low $Fe_2O_3$ contents are hence undesirable. In addition, by regulating the content of $Fe_2O_3$ to 0.001% or higher, heat radiation during glass melting can be inhibited from reaching the bottom of the melting furnace in an unnecessarily large amount and thereby imposing a burden on the melting tank. The content of $Fe_2O_3$ is more preferably 0.01% or higher, still more preferably 0.05% or higher.

In the case where the content of $Fe_2O_3$ exceeds 5%, heat transfer by radiation might be prevented to make the raw materials difficult to melt. In addition, in the case where the content of $Fe_2O_3$ is too high, the light transmittance in the visible region might decrease to make the glass substrate unsuitable for use in automotive window applications. The content of $Fe_2O_3$ is more preferably 1% or less, still more preferably 0.3% or less.

The glass substrate preferably has a content of $TiO_2$ of 0.001% or higher and 5% or less. By regulating the content of $TiO_2$ so as to be within that range, bubbles can be inhibited from forming a layer thereof on the surface of the molten glass in producing the glass substrate. Once a bubble layer has formed, the molten glass tends to be less apt to be heated and refined, resulting in impaired production efficiency. A titanium compound can be supplied as a defoamer to the bubble layer formed on the surface of the molten glass, in order to thin or eliminate the bubble layer formed on the surface of the molten glass. The titanium compound is taken by the molten glass to become present as $TiO_2$. The content of $TiO_2$ is more preferably 0.05% or higher. Since $TiO_2$ shows absorption in an ultraviolet region, it is preferred to add a titanium compound in the case where ultraviolet rays are desired to be cut off. In this case, the content of $TiO_2$ may be more preferably 0.1% or higher, still more preferably 0.5% or higher. However, too high contents of $TiO_2$ may result in an increase in liquidus temperature to cause devitrification. In addition, the glass substrate having too high a $TiO_2$ content may show absorption in the visible region, resulting in a yellow coloration. It is hence preferred to regulate the content of $TiO_2$ so as to be up to 5%. The content of $TiO_2$ is more preferably 0.5% or less, still more preferably 0.2% or less.

In the case where water is present in the glass substrate, this glass substrate has a reduced light transmittance in a near-infrared region because the water shows absorption in the near-infrared region, and this glass substrate is unsuitable for use in infrared-ray irradiation devices (e.g., laser radars). The content of water in glass can be generally expressed in terms of β-OH value. The β-OH value of the glass substrate is preferably 0.5 mm$^{-1}$ or less, more preferably 0.3 mm$^{-1}$ or less, still more preferably 0.2 mm$^{-1}$ or less. The β-OH can be obtained using the following equation from a light transmittance of the glass measured with an FT-IR (Fourier-transform infrared spectrometer).

$$\beta\text{-OH}=(1/X)\log_{10}(T_A/T_B)[\text{mm}^{-1}]$$

X: thickness [mm] of the sample
$T_A$: light transmittance [%] at reference wavenumber of 4,000 cm$^{-1}$
$T_B$: minimum light transmittance [%] at around hydroxyl-group absorption wavenumber of 3,600 cm$^{-1}$ From the standpoint of enhancing the heat-shielding properties of the glass substrate in this embodiment, the β-OH value of the glass is preferably 0.05 mm$^{-1}$ or higher, more preferably 0.10 mm$^{-1}$ or higher, still more preferably 0.15 mm$^{-1}$ or higher.

<Heat-Ray Reflection Film>

The radio-wave transmitting substrate according to this embodiment includes a heat-ray reflection film, and the heat-ray reflection film includes an electroconductive film. This radio-wave transmitting substrate hence performs the function of reflecting heat rays. The heat-ray reflection film may include layers other than the electroconductive film so long as the effect of the present invention is produced. Hereinafter, layers other than the electroconductive film in the heat-ray reflection film are often referred to as "other layers".

In this description, the term "electroconductive film" means a film having an electrical resistivity at 20° C. of $10^0$ [Ω·cm] or less. The electroconductive film is not particularly limited in components thereof. However, it is preferable that the electroconductive film includes, for example, a metal having excellent heat-ray reflecting properties, such as silver, aluminum, an indium-tin oxide (ITO), tin oxide doped with fluorine and/or antimony ($SnO_2$:F, Sb), titanium nitride, niobium nitride, chromium nitride, zirconium nitride, and hafnium nitride (hereinafter also referred to as "electroconductive-film component group A"), as a main component. In this description, the term "main component" used for a substance means that the content of this substance is 50 at. % or higher with respect to all the constituent components. That is, it is preferable that the electroconductive film in this embodiment includes at least one substance selected from the electroconductive-film component group A and that the total content of the electroconductive-film component group A in the electroconductive film in this embodiment is 50 at. % or higher.

From the standpoint of enabling the radio-wave transmitting region to have excellent heat-ray reflecting properties, the electroconductive film preferably includes at least one of silver or aluminum as a main component, and the electroconductive film more preferably includes silver as a main component (that is, the film includes 50 at. % or more silver), and still more preferably includes 95 at. % or more silver.

The electroconductive film including silver as a main component may contain one or more additional elements such as gold, palladium, copper, bismuth, neodymium, and platinum. By incorporating such additional elements into the electroconductive film including silver as a main component, the silver can be inhibited from diffusing and the moisture resistance can be improved. The additional elements are not limited to those shown above as examples, and any desired elements can be added so long as the effect of the present invention is produced.

The thickness of the electrocoductive film in this embodiment is not particularly limited. The thickness may be suitably regulated in accordance with the transparency to radio waves having a given frequency, heat-ray reflecting properties, transparency to visible light, appearance, etc. which are required of the radio-wave transmitting substrate to be finally obtained. The thickness of the electroconductive film may be usually 1 nm or larger, and is preferably 3 nm or larger, more preferably 5 nm or larger, still more preferably 6 nm or larger. The thickness thereof is preferably 100 nm or less, more preferably 50 nm or less, still more preferably 20 nm or less. The electroconductive film may be constituted of one layer only (single-layer structure) or may be composed of a plurality of layers, e.g., two or three layers. In the case where there are a plurality of layers, these layers may adjoin each other in the thickness direction of the electroconductive film or may be separated from each other by another layer interposed therebetween. In the case where the electroconductive film is composed of a plurality of layers, the total thickness thereof may be within the range shown above.

As stated above, the heat-ray reflection film in this embodiment may include layers (other layers) different from the electroconductive film, so long as the effect of the present invention is produced.

The radio-wave transmitting substrate according to this embodiment may include, for example, a metal oxide layer or a metal nitride layer. It is preferable that the radio-wave transmitting substrate includes at least one of a metal oxide layer and a metal nitride layer. In particular, it is preferable from the standpoint of durability that the heat-ray reflection film has a layer configuration in which the electroconductive film is sandwiched between said other layers, e.g., metal oxide layers or metal nitride layers. Examples of the metal oxide layers include layers of metal oxides including aluminum oxide, zinc oxide, indium oxide, titanium oxide, niobium oxide, tin oxide, bismuth oxide, tantalum oxide, tungsten oxide, zirconium oxide, silicon oxide, or the like as a main component. Preferred of these is a metal oxide layer including zinc oxide as a main component, because zinc oxide is satisfactorily compatible with silver, which is a preferred component of the electroconductive film, and is capable of enhancing the durability of the electroconductive film. Examples of the metal nitride layers include layers of metal nitrides including silicon nitride ($Si_3N_4$), aluminum nitride (AlN), or the like as a main component.

Methods for forming the heat-ray reflection film are not particularly limited. For example, use can be made of physical vapor deposition methods (vacuum deposition, ion plating, magnetron sputtering, etc.), chemical vapor deposition methods (thermal CVD, plasma-assisted CVD, photo-CVD, etc.), ion-beam sputtering, or the like. In the case where the film is deposited in a large area, it is preferred to use D.C. magnetron sputtering, D.C. pulse magnetron sputtering, or A.C. dual magnetron sputtering, because these techniques provide easy control for thickness evenness and have excellent production efficiency.

The heat-ray reflection film in this embodiment may be directly or indirectly formed on a dielectric substrate. Methods for indirectly forming the heat-ray reflection film on a dielectric substrate are not particularly limited. Examples thereof include a method in which a resin film on which the heat-ray reflection film has been formed is applied to the dielectric substrate.

Figure 2:
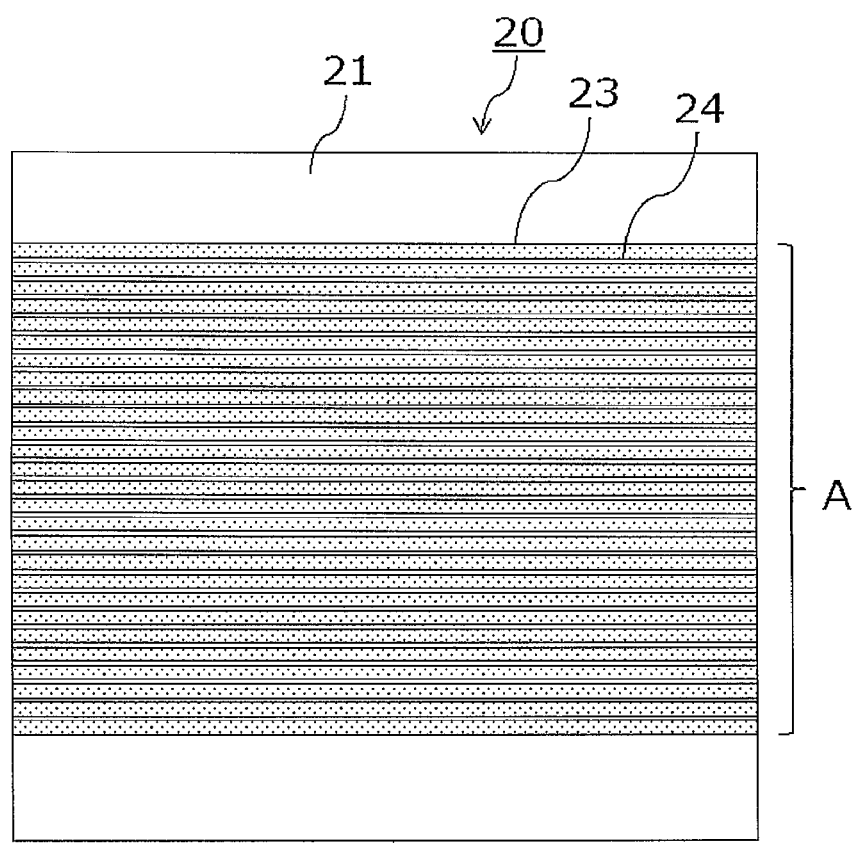
FIG. 2 illustrates another embodiment of the radio-wave transmitting substrate of the present invention.

In the embodiment shown in FIG. 1, the heat-ray reflection film 13 (and the openings 14) is formed on the whole of one main surface of the dielectric substrate 21. However, the heat-ray reflection film may be formed on only a part of one main surface. One example is shown in FIG. 2, which is a top view of a radio-wave transmitting substrate 20, as an embodiment, in which a heat-ray reflection film 23 and openings 24 are disposed on a part of one main surface of a dielectric substrate 21 and in which the dielectric substrate 21 are exposed in the remaining large portion.

<Opening>

The opening is a portion where at least the electroconductive film is absent in a plan view, and is separated by the heat-ray reflection film. In the case where the heat-ray reflection film includes both an electroconductive film and layers other than the electroconductive film, examples of the configuration of the opening include a configuration in which a portion, where the electroconductive film and all the layers other than the electroconductive film have been removed and where the dielectric substrate constitutes an outermost surface, is present. That is, examples of the configuration of the opening include a configuration in which the dielectric substrate is exposed.

The configuration of the opening is not limited to the configuration in which a portion where the dielectric substrate constitutes an outermost surface is present. The configuration may be, for example, such that the opening does not include the electroconductive film but includes at least one layer other than the electroconductive film, so long as the effect of the present invention is produced. Namely, in the opening, the electroconductive film is absent and only at least one layer (film having an electrical resistivity higher than $10^0$ [Ω·cm]) other than the electroconductive film may be laminated on the dielectric substrate. For example, in the opening, the electroconductive film is absent and an oxide layer or a nitride layer, such as those shown above in the explanation of other layers, may be laminated on the dielectric substrate.

In the embodiment shown in FIG. 1, the radio-wave transmitting region has openings which, in a plan view, are a plurality of parallel lines (hereinafter also referred to simply as "parallel lines"). However, the openings are not limited to linear portions, and may be, for example, circular or elliptic portions, dots, etc.

In the case where the openings are linear, the openings may be, for example, a lattice pattern, curved-line, zigzag, concentric-circle, spiral, or random-line arrangement, besides being straight lines. For example, examples of the straight-line openings include ones in which each opening has an outer shape that is rectangular or parallelogrammic.

Methods for forming the radio-wave transmitting region (methods for forming the opening) in this embodiment are not particularly limited. Examples thereof include: a method in which a continuous (solid) heat-ray reflection film is formed over a given region in the surface of a dielectric substrate without leaving the opening, and the heat-ray reflection film is thereafter partly removed to form the opening; and a method in which a heat-ray reflection film is formed only in given portions of the surface of a dielectric substrate to thereby obtain a radio-wave transmitting region.

Examples of methods for partly removing the heat-ray reflection film include laser etching and photolithography. Examples of methods for forming the opening including layers other than an electroconductive film by partly removing the electroconductive film only (or without depositing the electroconductive film) include a method in which the electroconductive film is partly removed by photolithography, laser etching, etc. and other layers are deposited thereafter.

Furthermore, examples of methods for forming a heat-ray reflection film only in a given portion of the surface of a dielectric substrate include a method in which the portion of the dielectric substrate surface where the heat-ray reflection film is not to be formed (portion where the opening is formed) is covered (masked) with a sheet or plate and then the heat-ray reflection film is formed.

The openings are preferably lines, more preferably straight-lines, from the standpoint of the efficiency of forming the openings. Especially in the case of forming openings by the method in which a heat-ray reflection film is partly removed by laser etching, straight-line openings extending in a first direction can be easily formed by conveying the substrate in the first direction while irradiating the heat-ray reflection film with fixed laser light. In addition, the substrate may, for example, be thereafter conveyed in a second direction different from the first direction while irradiating the heat-ray reflection film with fixed laser light. Thus, straight-line openings extending in the first and the second directions can be easily formed.

From the standpoint of ease of production described above, it is preferable that the openings in this embodiment are straight-lines extending in the first direction or are a combination of straight-lines extending in the first direction and straight-lines extending in the second direction. Specifically, it is preferable that the openings are either a plurality of parallel lines or a lattice pattern. This configuration is preferred because heat-ray reflection film portions having a given width and openings having a given width have been alternately disposed along the width direction(s) of the parallel lines or lattice pattern to impart periodicity and thereby enhance the transparency to radio waves having given frequencies.

For example, in the case where the openings, in a plan view of the radio-wave transmitting substrate, are either straight-lines having a given width and extending in one direction or portions disposed in a lattice pattern, and a plurality of these portions are disposed along the width direction in a parallel manner to form the radio-wave transmitting region, this radio-wave transmitting region has enhanced transparency to linearly polarized waves perpendicular to the extension direction. Because of this, the radio-wave transmitting substrate having such radio-wave transmitting region is advantageous in the case where given linearly polarized waves are desired to be highly efficiently transmitted. Specifically, the radio-wave transmitting substrate described above is apt to show high transparency to vertically polarized radio waves when installed perpendicularly to the ground so that the extension direction of the straight-line or lattice-pattern openings is horizontal to the ground.

<Radio-Wave Transmitting Region>

In this embodiment, the radio-wave transmitting region is a region where every 1-cm square unit region satisfies the following expression (a), and is a region which has excellent transparency to not only radio waves in conventional use but also radio waves having frequencies of about several hundred megahertz to tens of gigahertz. This radio-wave transmitting region exhibits better transparency especially to radio waves of 6 GHz to tens of gigahertz than conventional ones.

$$L > 802.6 \times S - 503.7 \quad (a)$$

(In expression (a), L is an overall length (unit: mm/cm$^2$) of a boundary between the heat-ray reflection film and the opening in the unit region, and S is a proportion of the area occupied by the heat-ray reflection film in the unit region.)

The radio-wave transmitting region in this embodiment may be formed only on one main surface of the dielectric substrate or may be formed on both main surfaces. In the case where the radio-wave transmitting region is formed on both main surfaces of the dielectric substrate, this embodiment may have a plan-view configuration where the radio-wave transmitting region on one main surface partly or wholly overlies the radio-wave transmitting region on the other main surface, or may have a plan-view configuration where the radio-wave transmitting regions on both main surfaces do not overlap each other at all.

The present inventors discovered that not only the areal proportion occupied by the heat-ray reflection film in the radio-wave transmitting region in a plan view, namely, the coverage with the heat-ray reflection film, but also the overall length of the boundaries between the heat-ray reflection film and the openings in the radio-wave transmitting region is a factor that affects the radio-wave transmitting properties. The inventors discovered that the radio-wave transmitting properties can be improved by increasing the overall length of the boundaries. Upon entrance of radio waves into the radio-wave transmitting region, an electromagnetic field is generated between electroconductive-film portions which face each other with an opening sandwiched therebetween, and the radio waves are emitted again on the side opposite from the entrance surface. Thus, high radio-wave transmitting properties are obtained. Furthermore, by increasing the overall length of the boundaries, the proportion of opposed electroconductive-film portions, which face each other with an opening sandwiched therebetween, is increased. Thus, the occurrence of an electromagnetic field is promoted and the efficacy of the re-emission is heighten, thereby improving the radio-wave transmitting properties.

On the basis of that idea, the present inventors discovered from experience that the region which satisfies the expression (a) shows especially satisfactory radio-wave transmitting properties and exhibits excellent transparency also to radio waves having frequencies of about several hundred megahertz to tens of gigahertz. The present invention has been achieved based on this finding.

So long as the difference between the left side and the right side of expression (a) [(left side)-(right side)], i.e., $\{L-(802.6 \times S-503.7)\}$, exceeds 0, the expression (a) is satisfied. However, increasing the difference tends to make it easy to obtain better radio-wave transmitting properties. That is, it is preferable that the difference between the left side and the right side of expression (a) [(left side)-(right side)] is large. The difference is preferably 100 or larger, more preferably 400 or larger. In other words, it is more preferable that every 1-cm square unit region in the radio-wave transmitting region in this embodiment satisfies the following expression (a-1), still more preferably satisfies the following expression (a-2).

$$L > 802.6 \times S - 403.7 \quad (a-1)$$

$$L > 802.6 \times S - 103.7 \quad (a-2)$$

The values of the overall length L of the boundary between the heat-ray reflection film and the opening in the unit region and the proportion S of the area occupied by the heat-ray reflection film in the unit region differ depending on the unit region within the radio-wave transmitting regions examined.

In the case where a value obtained by dividing the overall length of the boundary between the heat-ray reflection film and the opening in the whole radio-wave transmitting region by the area (unit: cm$^2$) of the whole radio-wave transmitting region (hereinafter, this value is referred to also as "average boundary length per unit area of the radio-wave transmitting region") is expressed by L' and where a value obtained by dividing the overall area of the heat-ray reflection film in the radio-wave transmitting region by the overall area of the radio-wave transmitting region (hereinafter, this value is referred to also as "coverage of the radio-wave transmitting region with the heat-ray reflection film") is expressed by S', L and S differ from L' and S' depending on the unit regions examined.

However, in the case where the openings are disposed approximately at regular intervals and the widths of the openings and heat-ray reflection film are sufficiently small as compared with the length of each side (i.e., 1 cm) of the unit regions, L and S are approximately the same as L' and S' even when any unit region in the radio-wave transmitting region is examined.

In this embodiment, the S' is preferably 65% or larger, more preferably 80% or larger, still more preferably 90% or larger. The L' is preferably 100 mm/cm$^2$ or larger, more preferably 300 mm/cm$^2$ or larger, still more preferably 500 mm/cm$^2$ or larger. The difference between the L and the L' and that between the S and the S' are preferably within ±10%, more preferably within ±5%.

The present inventors discovered that in the case where the radio-wave transmitting region further satisfies the following expression (b), this radio-wave transmitting region is especially excellent also in terms of heat-ray reflecting property and a radio-wave transmitting substrate combining excellent radio-wave transmitting properties and heat-ray reflecting properties is obtained. That is, it is more preferable in this embodiment that the radio-wave transmitting region satisfies the following expression (b).

$$Z > (-Z' + Z' \times S' + 0.3)/S' \quad (b)$$

(In expression (b), Z is a solar reflectance of the heat-ray reflection film, Z' is a solar reflectance of the opening, and S' is the coverage of the radio-wave transmitting region with the heat-ray reflection film.)

The solar reflectance above means the solar reflectance defined in JIS R3106 (year 1998). This standard applies also to the solar reflectance which is mentioned later. In the case where no heat-ray reflection film is present in the opening, the Z' corresponds the solar reflectance of the dielectric substrate.

In this embodiment, from the standpoint of heat-ray reflecting property, the radio-wave transmitting region more preferably satisfies the following expression (b-1), still more preferably satisfies the following expression (b-2), and especially preferably satisfies the following expression (b-3).

$$Z > (-Z' + Z' \times S' + 0.35)/S' \quad (b-1)$$

$$Z > (-Z' + Z' \times S' + 0.4)/S' \quad (b-2)$$

$$Z > (-Z' + Z' \times S' + 0.43)/S' \quad (b-3)$$

(In expressions (b-1), (b-2), and (b-3), Z is a solar reflectance of the heat-ray reflection film, Z' is a solar reflectance of the opening, and S' is the coverage of the radio-wave transmitting region with the heat-ray reflection film.)

The present inventors discovered that in the case where the radio-wave transmitting region further satisfies the following expression (c), the opening is less apt to be visually recognized and the radio-wave transmitting region has an excellent appearance. That is, it is more preferable in this embodiment that the radio-wave transmitting region satisfies the following expression (c).

$$\Delta E < 60.3 \times D^{-0.62} \quad (c)$$

(In expression (c), ΔE is a color difference between the heat-ray reflection film and the opening, and D is a width (unit: mm) of the opening.)

That is, the smaller the ΔE and the smaller the D, the less the opening is visually recognized. In the case where no heat-ray reflection film is present in the opening, the surface of the opening corresponds to the dielectric substrate.

In this embodiment, from the standpoint of making the opening less apt to be visually recognized, the radio-wave transmitting region more preferably satisfies the following expression (c-1), still more preferably satisfies the following expression (c-2), and especially preferably satisfies the following expression (c-3).

$$\Delta E < 60.3 \times D^{-0.62} - 50 \quad (c\text{-}1)$$

$$\Delta E < 60.3 \times D^{-0.62} - 150 \quad (c\text{-}2)$$

$$\Delta E < 60.3 \times D^{-0.62} - 350 \quad (c\text{-}3)$$

(In expressions (c-1) to (c-3), ΔE is a color difference between the heat-ray reflection film and the opening, and D is a width (unit: mm) of the opening.)

More specifically, the color difference ΔE between the heat-ray reflection film and the opening is the color difference between the heat-ray reflection film and the opening which is defined by the following expression (c-i) according to the L*a*b* color system.

$$\Delta E = \{(\Delta L^*)^2 + (\Delta a^*)^2 + (\Delta b^*)^2\}^{1/2} \quad (c\text{-}i)$$

In the expression (c-i), ΔL*, Δa*, and Δb* are values defined by the following expressions (c-ii) to (c-iv).

$$\Delta L^* = |L^*(\text{heat-ray reflection film}) - L^*(\text{opening})| \quad (c\text{-}ii)$$

$$\Delta a^* = |a^*(\text{heat-ray reflection film}) - a^*(\text{opening})| \quad (c\text{-}iii)$$

$$\Delta b^* = |b^*(\text{heat-ray reflection film}) - b^*(\text{opening})| \quad (c\text{-}iv)$$

In expressions (c-ii) to (c-iv), L*(heat-ray reflection film), a*(heat-ray reflection film), and b*(heat-ray reflection film) respectively are color tones of the heat-ray reflection film according to the L*a*b* color system.

In expressions (c-ii) to (c-iv), L*(opening), a*(opening), and b*(opening) respectively are color tones of the opening according to the L*a*b* color system.

ΔE can be determined by the method which is described in the Examples.

In the case where the openings are lines, the width D of the opening means the width (thickness) of each line. In the case where the openings are dots or circular, elliptic, or the like, the width D of the opening means the shortest length of line segments which can be drawn within the opening and which pass through the center of gravity of the shape of the opening. That is, in the case where the openings each have the shape of a square dot, the width D of the opening means the length of each side of the square. In the case where the openings each have the shape of a rectangular dot, the width D of the opening means the length of each minor side of the rectangle. In the case where the openings are each circular, the width D of the opening means the diameter of the circle. In the case where the openings are each elliptic, the width D of the opening means the length of the minor axis of the ellipse.

Moreover, in the case where a plurality of openings differing in width are present in the radio-wave transmitting region, the width of the opening having a largest width is taken as the width D of opening in the expression (c) to assess whether or not the radio-wave transmitting region satisfies the expression (c).

<Radio-Wave Nontransmitting Region>

In this embodiment, the region of the radio-wave transmitting substrate which includes both a heat-ray reflection film and an opening may be entirely a radio-wave transmitting region or may partly include a radio-wave transmitting region. Hereinafter, of the region of the radio-wave transmitting substrate which includes both a heat-ray reflection film and an opening, the region other than the radio-wave transmitting region is often referred to as a radio-wave nontransmitting region.

Figure 3:
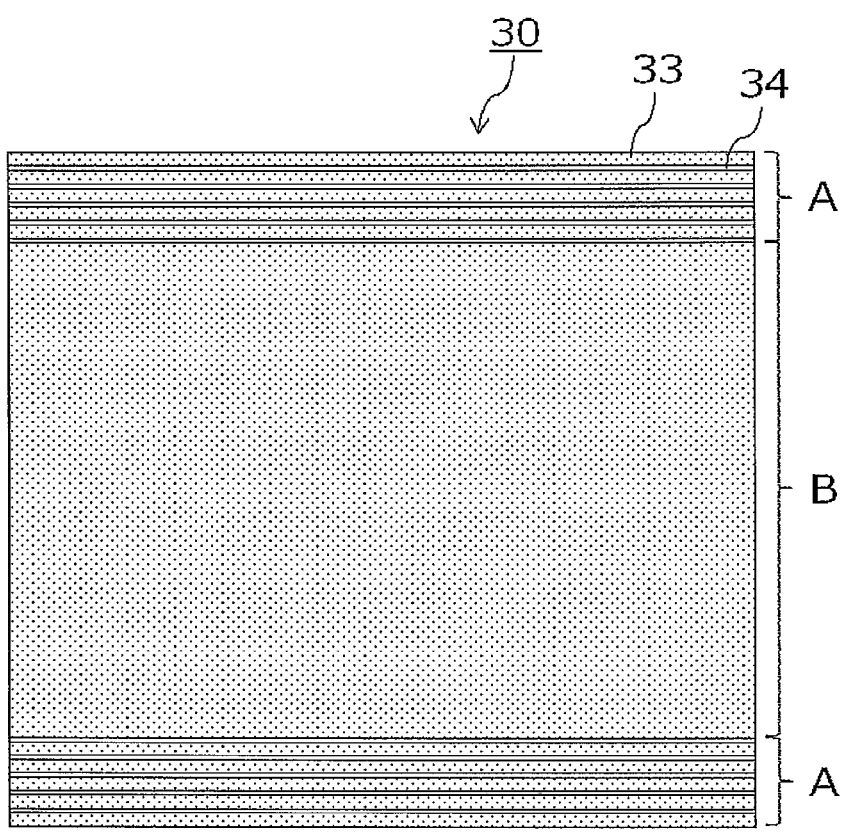
FIG. 3 illustrates still another embodiment of the radio-wave transmitting substrate of the present invention.

That is, although the entire area of a surface of the radio-wave transmitting substrate according to the embodiment shown in FIG. 1 is the radio-wave transmitting region A, some of the surface of the radio-wave transmitting substrate may be the radio-wave transmitting regions A and the remaining portion thereof may be a radio-wave nontransmitting region B as in the radio-wave transmitting substrate 30 according to another embodiment shown in FIG. 3.

The radio-wave nontransmitting region is a region which lies in the region of the radio-wave transmitting substrate that includes a heat-ray reflection film and an opening and in which every 1-cm square unit region including said region satisfies the following expression (d).

$$L \leq 802.6 \times S - 503.7 \quad (d)$$

(In expression (d), L is an overall length (unit: [mm/cm$^2$]) of a boundary between the heat-ray reflection film and the opening in the unit region, and S is a proportion of the area occupied by the heat-ray reflection film in the unit region.)

The radio-wave nontransmitting region may or may not have an opening. That is, the radio-wave nontransmitting region may be a region in which an opening is formed so that the expression (d) is satisfied, or may be a region which includes a heat-ray reflection film only without being provided with an opening. However, it is preferable that the radio-wave nontransmitting region is a region which includes a heat-ray reflection film only and includes no opening, from the standpoints of enhancing the heat-ray reflecting properties and preventing the radio-wave transmitting substrate from having an impaired appearance due to opening which is easy to visually recognize.

As described above, the radio-wave transmitting substrate according to this embodiment may include or may not include the radio-wave nontransmitting region.

For example, in the case where a large proportion of the radio-wave transmitting substrate is required to have radio-wave transmitting properties, it is often preferable that the entire surface of the radio-wave transmitting substrate is a radio-wave transmitting region and no radio-wave nontransmitting region is included.

On the other hand, for example, in the case where a radio-wave transceiver is to be disposed on a part of the radio-wave transmitting substrate, this radio-wave transmitting substrate is often configured so that only the area necessary for transmission by the transceiver is a radio-wave transmitting region and the other portion is a radio-wave nontransmitting region.

<Properties of the Radio-Wave Transmitting Substrate>

The radio-wave transmitting region of the radio-wave transmitting substrate according to this embodiment exhibits excellent transparency also to, in particular, radio waves having frequencies of about several hundred megahertz to tens of gigahertz, and further exhibits excellent transparency to radio waves having frequencies of about 6 GHz to tends of gigahertz. More specifically, in the radio-wave transmitting substrate according to this embodiment, the radio-wave transmitting region is less apt to inhibit the transmission of radio waves having given frequencies.

In the radio-wave transmitting substrate according to this embodiment, the radio-wave transmitting region has a radio-wave transmission loss, in the transmission of radio waves having a frequency of 28 GHz, of preferably 3 dB or less, more preferably 2 dB or less, still more preferably 1 dB or less. The radio-wave transmission loss thereof in the transmission of radio waves having a frequency of 79 GHz is likewise preferably 3 dB or less, more preferably 2 dB or less, still more preferably 1 dB or less.

The radio-wave transmission loss of the radio-wave transmitting region in the transmission of radio waves having a frequency of 28 GHz (79 GHz) is a value obtained by subtracting the radio-wave transmission loss of the dielectric substrate in the transmission of radio waves having a frequency of 28 GHz (79 GHz) from the radio-wave transmission loss of the entire radio-wave transmitting substrate within the radio-wave transmitting region in the transmission of radio waves having a frequency of 28 GHz (79 GHz).

Although the radio-wave transparency of the radio-wave transmitting region was explained above using the radio-wave transmission loss thereof in the transmission of radio waves having frequencies of 28 GHz and 79 GHz as an example, the radio-waves are not limited to the 28-GHz band and the 79-GHz band. It is preferable that the same radio-wave transmission loss as shown above is obtained in the transmission of radio waves having frequencies ranging from about several hundred megahertz to tens of gigahertz.

It is preferable that the radio-wave transmitting substrate according to this embodiment has excellent heat-ray reflecting properties. The heat-ray reflecting properties can be evaluated in terms of the solar reflectance defined, for example, in JIS R3106 (year 1998). The solar reflectance of the radio-wave transmitting region of the radio-wave transmitting substrate according to this embodiment is preferably 30% or higher, more preferably 35% or higher, still more preferably 40% or higher.

EXAMPLES

The present invention is explained in detail below with reference to Examples, but the invention is not limited to the following Examples.

[Production of Radio-Wave Transmitting Substrates]

First, glass sheets were produced as dielectric substrates. Specifically, raw materials were introduced into a platinum crucible so as to result in each of the glass compositions (unit: mol %) shown in Table 1, and were melted by heating at 1,550° C. for 2 hours. Thereafter, the melts were each poured onto a carbon plate and gradually cooled, thereby obtaining seven kinds of glass sheets as Composition Examples 1 to 7. Both surfaces of each sheet obtained were polished to obtain a glass sheet having a size of 100 mm×100 mm and a thickness of 2.8 mm. In Table 1 are shown the specific gravity, average coefficient of thermal expansion at 50° C. to 350° C., T$_2$, T$_4$, T$_1$, glass transition temperature Tg, and β-OH of each glass sheet obtained. In the table, the symbol "-" indicates that the property was not determined. Values determined from the compositions by calculations are shown in parentheses.

Subsequently, the glass sheet of Composition Example 1 was washed and introduced into an in-line type sputtering device and into the load lock chamber, which was evacuated to a degree of vacuum of 2×10$^{-6}$ Torr or a lower pressure. Subsequently, the glass sheet was introduced into the sputtering chamber, and a layer of a tin-doped zinc oxide and a layer of an aluminum-doped zinc oxide were deposited on a surface of the glass sheet so that the total thickness of the two layers was 43.5 nm. Subsequently, films were successively deposited in the following order: 12.5-nm-thick silver; 2-nm titanium; an aluminum-doped zinc oxide, a tin-doped zinc oxide, and an aluminum-doped zinc oxide, in this order in a total thickness of the three layers of 87.5 nm;

12.5-nm silver; 2-nm titanium; an aluminum-doped zinc oxide and a tin-doped zinc oxide, in this order in a total thickness of the two layers of 31.5 nm; and 1-nm titanium oxide. After the deposition, the multilayered structure was heat-treated in air under the conditions of 730° C. and 4 minutes, thereby obtaining a glass sheet having a heat-ray reflection film deposited thereon.

Next, using Laser Decoat, a plurality of linear openings disposed along the width direction in a parallel manner at regular intervals were formed over the whole area (100 mm×100 mm) of the heat-ray reflection film so that the heat-ray reflection film had a width of 0.07 mm and the openings had a width of 0.03 mm. Thus, a radio-wave transmitting substrate of Example 1 was obtained. Furthermore, radio-wave transmitting substrates of Examples 2 to 13 and Comparative Examples 1 to 9 were obtained in the same manner as in Example 1, except that the width of the heat-ray reflection film and the width of the openings were changed to the values shown in Table 2.

In Example 14, a glass sheet of Composition Example 4 having a thickness of 1.8 mm was used. In the same manner as in Example 1, a layer of a tin-doped zinc oxide and a layer of an aluminum-doped zinc oxide were deposited on a surface of the glass sheet so that the total thickness of the two layers was 50 nm. Subsequently, films were successively deposited in the following order: 17.5-nm-thick silver; 1-nm titanium; an aluminum-doped zinc oxide, a tin-doped zinc oxide, and an aluminum-doped zinc oxide, in this order in a total thickness of the three layers of 80 nm; 9.5-nm silver; 1-nm titanium; an aluminum-doped zinc oxide and a tin-doped zinc oxide, in this order in a total thickness of the two layers of 55 nm; 11.5-nm silver; 1-nm titanium; an aluminum-doped zinc oxide and a tin-doped zinc oxide, in this order in a total thickness of the two layers of 28 nm; and 1-nm titanium oxide. After the deposition, the multilayered structure was heat-treated in air under the conditions of 730° C. and 4 minutes, thereby obtaining a glass sheet having a heat-ray reflection film deposited thereon.

Next, using Laser Decoat, a plurality of linear openings disposed along the width direction in a parallel manner at regular intervals were formed over the whole area (100 mm×100 mm) of the heat-ray reflection film so that the heat-ray reflection film had a width of 0.2 mm and the openings had a width of 0.099 mm. Thus, a radio-wave transmitting substrate of Example 14 was obtained.

In Example 15, a glass sheet of Composition Example 5 having a thickness of 1.8 mm was used. A heat-ray reflection film was deposited in the same manner as in Example 14. Thereafter, a plurality of linear openings disposed in a lattice arrangement were formed with Laser Decoat over the whole area (100 mm×100 mm) of the heat-ray reflection film so that the heat-ray reflection film had a width of 0.1 mm and the openings had a width of 0.05 mm. Thus, a radio-wave transmitting substrate was obtained.

In Example 16, a glass sheet of Composition Example 1 having a thickness of 8.0 mm was used. At a substrate temperature of 600° C., a 55-nm film of SiOC and a 320-nm film of a fluorine-doped tin oxide ($SnO_2$:F) were successively deposited by thermal CVD. Subsequently, a plurality of linear openings disposed in the width direction along a parallel manner at regular intervals were formed with Laser Decoat over the whole area (100 mm×100 mm) of the heat-ray reflection film so that the heat-ray reflection film had a width of 0.321 mm and the openings had a width of 0.030 mm. Thus, a radio-wave transmitting substrate of Example 14 was obtained.

In Example 17, a glass sheet of Composition Example 1 having a thickness of 6.0 mm was used. In the same manner as in Example 1, a 30-nm film of an Al-doped silicon nitride, a 30-nm film of chromium nitride, and a 30-nm film of an Al-doped silicon nitride were successively deposited. Subsequently, a plurality of linear openings disposed along the width direction in a parallel manner at regular intervals were formed with Laser Decoat over the whole area (100 mm×100 mm) of the heat-ray reflection film so that the heat-ray reflection film had a width of 0.128 mm and the openings had a width of 0.030 mm. Thus, a radio-wave transmitting substrate of Example 17 was obtained.

As stated above, each of the radio-wave transmitting substrates of the Examples and Comparative Examples had a radio-wave transmitting region formed over the entire surface (100 mm×100 mm) in a plan view of the radio-wave transmitting substrate, as shown in FIG. 1.

Table 2 shows the width of the heat-ray reflection film, width D of the openings, coverage S' of the radio-wave transmitting region with the heat-ray reflection film, and average length L' of boundaries per unit area in the radio-wave transmitting region, in each of the Examples and Comparative Examples.

In each of the Examples and Comparative Examples, all the films formed in the openings have been removed. That is, the glass sheet is exposed in the openings. Consequently, in each of the Examples and Comparative Examples, the solar reflectance and chromaticity of the openings are the same as the solar reflectance and chromaticity of the glass sheet.

[Measurement of Solar Reflectance and Visible-Light Transmittance]

With respect to each of the radio-wave transmitting substrates of the Examples and Comparative Examples, the surface where the radio-wave transmitting region had been disposed was examined with a spectrophotometer ("U-4100", manufactured by Hitachi High-Technologies Corp.) to measure the solar reflectance and visible-light transmittance thereof in accordance with JIS R3106 (year 1998). Furthermore, the glass sheet on which the electroconductive film had been entirely formed but the openings had not been disposed and the glass sheet on which the heat-ray reflection film had not been disposed were likewise examined to measure the solar reflectance Z of the heat-ray reflection film and the solar reflectance Z' of the openings. The results are shown in Table 2.

[Determination of Color Difference]

The glass sheet on which the heat-ray reflection film had been entirely formed but the openings had not been disposed and the glass sheet on which the heat-ray reflection film had not been formed were examined with a spectrophotometer ("U-4100", manufactured by Hitachi High-Technologies Corp.) to measure the light transmittance within the wavelength range of 300 nm to 800 nm. In accordance with JIS Z8729, light from illuminant C entered each glass sheet by 2 degree to measure the chromaticity of the transmitted light according to the L*a*b* color system. From the chromaticity obtained, the color difference ΔE between the heat-ray reflection film and the openings was calculated. The results are shown in Table 2.

[Assessment with Expressions (a), (b), and (c)]

In Table 2 are shown the differences between the left side and the right side [(left side)-(right side)] of each of the following expressions (a), (b), and (c), with respect to the radio-wave transmitting substrates of the Examples and Comparative Examples.

$$L > 802.6 \times S - 503.7 \quad (a)$$

$$Z > (-Z' + Z' \times S' + 0.3)/S' \quad (b)$$

$$\Delta E < 60.3 \times D^{-0.62} \quad (c)$$

Expressions (a) and (b) are satisfied in the case where the values shown in Table 2 are larger than 0. Expression (c) is satisfied in the case where the value shown in Table 2 is smaller than 0.

In each of the Examples and Comparative Examples, the openings had been disposed at regular intervals and the widths of the openings and heat-ray reflection film were far smaller than 1 cm. Because of this, L' and S' were used respectively in place of L and S in the calculation for expression (a).

[Determination of Radio-Wave Transmission Loss]

The radio-wave transmission loss of each radio-wave transmitting substrate produced was measured by the free-space method in the following manner. Antennas were arranged opposite, and the obtained radio-wave transmitting substrate was disposed therebetween so that the extension direction of the openings was perpendicular to the radio-wave polarization direction. The loss for an opening with a diameter of 100 mm where no radio-wave transmitting substrate was present was taken as 0 dB to measure the radio-wave transmission loss in the transmission of radio waves having a frequency of 28 GHz. The glass sheet alone on which the heat-ray reflection film had not been formed was also examined for radio-wave transmission loss in the same manner. The radio-wave transmission loss of the radio-wave transmitting region in each of the radio-wave transmitting substrates of the Examples and Comparative Examples, in the transmission of radio waves having a frequency of 28 GHz, was calculated from the measured values. The results thereof are shown in Table 2.

TABLE 1

| | | Compositional Example | | | | | | |
|---|---|---|---|---|---|---|---|---|
| | | Ex.1 | Ex.2 | Ex.3 | Ex.4 | Ex.5 | Ex.6 | Ex.7 |
| Composition (mol %) | $SiO_2$ | 71.4 | 69.7 | 72.4 | 73.7 | 69.7 | 70.1 | 75.5 |
| | $Al_2O_3$ | 1.0 | 0.9 | 1.5 | 0.1 | 0.9 | 0 | 0.3 |
| | $B_2O_3$ | 0.0 | 0 | 0 | 0 | 0 | 0 | 0 |
| | MgO | 6.1 | 7 | 0.1 | 0.1 | 7 | 7.3 | 0 |
| | CaO | 8.7 | 9 | 11.5 | 11.5 | 9 | 9.3 | 6 |
| | SrO | 0.0 | 0 | 0 | 0 | 0 | 0 | 0 |
| | BaO | 0.0 | 0 | 0 | 0 | 0 | 0 | 0 |
| | $TiO_2$ | 0.02 | 0.05 | 0.05 | 0.05 | 0.05 | 0.01 | 0.05 |
| | $ZrO_2$ | 0.0 | 0 | 0 | 0 | 0 | 0 | 0 |
| | $Li_2O$ | 0.0 | 0 | 0 | 0 | 0 | 0 | 6.0 |
| | $Na_2O$ | 12.5 | 12.6 | 7.2 | 7.2 | 6.6 | 8.6 | 6.0 |
| | $K_2O$ | 0.3 | 0.6 | 7.2 | 7.2 | 6.6 | 4.6 | 6.0 |
| | $Fe_2O_3$ | 0.03 | 0.2 | 0.004 | 0.15 | 0.1 | 0.06 | 0.18 |
| Specific gravity | | 2.50 | 2.51 | 2.49 | 2.49 | 2.50 | 2.50 | 2.44 |
| Average coefficient of linear expansion ($10^{-7}$/° C.) | | 89 | 92 | 96 | 97 | (93) | (94) | 95 |
| Young's modulus (GPa) | | 73 | 74 | 71 | 71 | (72) | (74) | — |
| $T_2$ (° C.) | | 1469 | 1464 | 1464 | 1437 | — | — | — |
| $T_4$ (° C.) | | 1045 | 1041 | 1050 | 1030 | — | — | — |
| $T_L$ (° C.) | | 1021 | 1008 | 990 | 900 | — | — | — |
| Tg (° C.) | | 548 | 544 | 561 | 547 | (560) | (545) | 457 |
| β-OH ($mm^{-1}$) | | 0.26 | 0.19 | 0.15 | 0.29 | 0.10 | 0.05 | 0.23 |

TABLE 2

| No. | Width of heat-ray reflection film [mm] | Width D of opening [mm] | S' [%] | L' [mm/$cm^2$] | Solar reflectance [%] | | | Visible-light transmittance (%) |
|---|---|---|---|---|---|---|---|---|
| | | | | | Radio-wave transmitting substrate | Heat-ray reflection film | Glass sheet | |
| Example 1 | 0.070 | 0.030 | 70.00 | 2000 | 31.8 | 44.6 | 8.8 | 77.5 |
| Example 2 | 0.270 | 0.030 | 90.00 | 667 | 40.1 | | | 80.8 |
| Example 3 | 0.200 | 0.099 | 67.00 | 667 | 31.6 | | | 79.7 |
| Example 4 | 0.079 | 0.030 | 72.50 | 1835 | 31.6 | | | 76.9 |
| Example 5 | 0.128 | 0.030 | 81.00 | 1266 | 35.9 | | | 77.9 |
| Example 6 | 0.196 | 0.030 | 86.70 | 885 | 38.9 | | | 78.7 |
| Example 7 | 0.321 | 0.030 | 91.50 | 570 | 40.6 | | | 78.9 |
| Example 8 | 0.286 | 0.215 | 57.10 | 399 | 29.8 | | | 81.4 |
| Example 9 | 0.528 | 0.215 | 71.10 | 269 | 35.2 | | | 80.7 |
| Example 10 | 0.862 | 0.216 | 80.00 | 186 | 38.1 | | | 79.9 |
| Example 11 | 0.127 | 0.215 | 37.10 | 585 | 22.1 | | | 81.7 |
| Example 12 | 0.273 | 0.465 | 37.00 | 271 | 22.0 | | | 79.4 |
| Example 13 | 0.615 | 0.464 | 57.00 | 185 | 29.8 | | | 78.9 |
| Example 14 | 0.200 | 0.099 | 67.00 | 667 | 33.1 | 50.0 | 8.8 | 55.0 |
| Example 15 | 0.100 | 0.050 | 66.67 | 1742 | 33.0 | 50.0 | 8.8 | 54.4 |
| Example 16 | 0.321 | 0.030 | 91.50 | 570 | 30.8 | 33.1 | 8.8 | 52.1 |
| Example 17 | 0.128 | 0.030 | 81.00 | 1266 | 32.5 | 38.7 | 8.8 | 19.7 |
| Comparative Example 1 | 0.900 | 0.100 | 90.00 | 200 | 40.8 | 44.6 | 8.8 | 79.4 |
| Comparative Example 2 | 2.900 | 0.090 | 97.00 | 67 | 43.5 | | | — |
| Comparative Example 3 | 1.551 | 0.030 | 98.10 | 127 | 45.5 | | | — |
| Comparative Example 4 | 1.324 | 0.216 | 86.00 | 130 | 40.4 | | | — |
| Comparative Example 5 | 2.179 | 0.216 | 91.00 | 84 | 40.9 | | | — |
| Comparative Example 6 | 5.171 | 0.215 | 96.00 | 37 | 45.2 | | | — |
| Comparative Example 7 | 1.857 | 0.464 | 80.00 | 86 | 36.5 | | | — |
| Comparative Example 8 | 2.851 | 0.464 | 86.00 | 60 | 39.4 | | | — |

TABLE 2-continued

| | | | | | | |
|---|---|---|---|---|---|---|
| Comparative Example 9 | 1.551 | 0.030 | 98.10 | 127 | 44.0 | 79.0 |

| No. | ΔE | (Left side)-(right side) | | | Radio-wave transmission loss [dB] | Glass composition | Sheet thickness [mm] |
| | | Expression (a) | Expression (b) | Expression (c) | | | |
|---|---|---|---|---|---|---|---|
| Example 1 | 6.49 | 1941.88 | 0.06 | −524 | 0.4 | 1 | 2.8 |
| Example 2 | | 448.03 | 0.12 | −524 | 1.0 | | |
| Example 3 | | 632.62 | 0.04 | −247 | 0.6 | | |
| Example 4 | | 1756.68 | 0.07 | −524 | 0.3 | | |
| Example 5 | | 1119.42 | 0.10 | −524 | 0.5 | | |
| Example 6 | | 692.80 | 0.11 | −523 | 0.7 | | |
| Example 7 | | 339.12 | 0.13 | −526 | 1.2 | | |
| Example 8 | | 444.62 | −0.01 | −150 | 0.6 | | |
| Example 9 | | 202.23 | 0.06 | −150 | 1.2 | | |
| Example 10 | | 47.32 | 0.09 | −150 | 2.2 | | |
| Example 11 | | 790.73 | −0.21 | −150 | 0.3 | | |
| Example 12 | | 478.11 | −0.21 | −90 | 0.4 | | |
| Example 13 | | 231.57 | 0.01 | −91 | 1.0 | | |
| Example 14 | 9.18 | 448.03 | 0.18 | −524 | 2.3 | 4 | 1.8 |
| Example 15 | 9.18 | 703.41 | 0.18 | −377 | 0.8 | 5 | 1.8 |
| Example 16 | 6.57 | 339.12 | 0.01 | −245 | 1.2 | 1 | 8.0 |
| Example 17 | 44.60 | 1119.42 | 0.04 | −486 | 0.8 | | 6.0 |
| Comparative Example 1 | 6.49 | −18.64 | 0.12 | −245 | 3.1 | | 2.8 |
| Comparative Example 2 | | −208.16 | 0.14 | −262 | 11.2 | | |
| Comparative Example 3 | | −157.15 | 0.14 | −523 | 8.0 | | |
| Comparative Example 4 | | −56.58 | 0.11 | −150 | 4.0 | | |
| Comparative Example 5 | | −143.12 | 0.13 | −150 | 7.8 | | |
| Comparative Example 6 | | −229.66 | 0.14 | −150 | 12.1 | | |
| Comparative Example 7 | | −52.21 | 0.09 | −91 | 5.1 | | |
| Comparative Example 8 | | −126.20 | 0.11 | −91 | 9.5 | | |
| Comparative Example 9 | | −157.15 | 0.14 | −523 | 7.6 | | |

In the radio-wave transmitting substrates of Comparative Examples 1 to 9, which did not satisfy expression (a), the radio-wave transmitting regions each had a radio-wave transmission loss higher than 3 dB in the transmission of radio waves having a frequency of 28 GHz. These radio-wave transmitting substrates had poor radio-wave transmitting properties.

Meanwhile, the evaluation of the radio-wave transmitting substrates of Examples 1 to 17, which satisfied expression (a), for radio-wave transmission loss gave results indicating that the radio-wave transmitting regions each had a radio-wave transmission loss of 3 dB or less in the transmission of radio waves having a frequency of 28 GHz. These radio-wave transmitting substrates had excellent radio-wave transmitting properties.

The radio-wave transmitting substrates of Examples 1 to 7, 9, 10, and 13 to 17, which further satisfied expression (b), each had a relatively high solar reflectance and excellent heat-ray reflecting properties. In addition, all the radio-wave transmitting substrates of Examples 1 to 17 satisfied expression (c) so that the openings were less apt to be visually recognized and these radio-wave transmitting substrates had an excellent appearance.

With respect to radio-wave transmitting substrates produced from glass sheets of Composition Examples 2 to 7 also, the radio-wave transmitting substrates satisfying expression (a) give results indicating that the radio-wave transmitting regions each have a radio-wave transmission loss of 3 dB or less in the transmission of radio waves having a frequency of 28 GHz. These radio-wave transmitting substrates have excellent radio-wave transmitting properties.

While the invention has been described in detail and with reference to specific embodiments thereof, it will be apparent to one skilled in the art that various changes and modifications can be made therein without departing from the spirit and scope thereof. This application is based on a Japanese patent application filed on Sep. 14, 2018 (Application No. 2018-172749) and a Japanese patent application filed on Oct. 26, 2018 (Application No. 2018-202102), the entire contents thereof being incorporated herein by reference. All the references cited here are incorporated herein as a whole.

REFERENCE SIGNS LIST 10, 20, 30 Radio-wave transmitting substrate
11, 21 Dielectric substrate
13, 23, 33 Heat-ray reflection film
14, 24, 34 Opening
A Radio-wave transmitting region
B Radio-wave nontransmitting region

The invention claimed is:

1. A radio-wave transmitting substrate, comprising:
a glass substrate; and
a heat-ray reflection film formed on at least one main surface of the glass substrate and comprising an electroconductive film and a plurality of layers comprising a metal oxide and/or a metal nitride and sandwiching the electroconductive film such that the heat-ray reflection film has an opening where the electroconductive film is absent,
wherein one of the layers comprising the metal oxide and/or the metal nitride in the heat-ray reflection film is directly deposited on the at least one main surface of the glass substrate such that the one of the layers contacts the at least one main surface of the glass substrate, the electroconductive film comprises 50 at. % or more of silver, at least a part of the at least one main surface in a plan view is a radio-wave transmitting region, the radio-wave transmitting region is a region where every 1-cm square unit region in the region satisfies L>802.6×S−503.7 where L is an overall length in mm/cm$^2$ of a boundary between the heat-ray reflection film and the opening in the unit region, and S is a proportion of an area occupied by the heat-ray reflection film in the unit region, and the radio-wave transmitting region satisfies Z>(—Z'+Z'×S'+0.35)/S' where Z is a solar reflectance of the heat-ray reflection film, Z' is a solar reflectance of the opening, and S' is a proportion of the area of the heat-ray reflection film to an area of the radio-wave transmitting region.

2. The radio-wave transmitting substrate according to claim 1, wherein the radio-wave transmitting region satisfies Z>(—Z'+Z'×S'+0.4)/S' where Z is a solar reflectance of the heat-ray reflection film, Z' is a solar reflectance of the opening, and S' is a proportion of the area of the heat-ray reflection film to an area of the radio-wave transmitting region.

3. The radio-wave transmitting substrate according to claim 1, wherein the radio-wave transmitting region satisfies $\Delta E<60.3\times D^{-0.62}$ where $\Delta E$ is a color difference between the heat-ray reflection film and the opening, and D is a width in mm of the opening.

4. The radio-wave transmitting substrate according to claim 1, wherein the radio-wave transmitting region has a radio-wave transmission loss of 3 dB or less in transmitting radio waves having a frequency of 28 GHz.

5. The radio-wave transmitting substrate according to claim 4, wherein the opening is formed in a plurality such that the plurality of openings is a plurality of parallel lines or a lattice pattern.

6. The radio-wave transmitting substrate according to claim 4, wherein the dielectric substrate has a radio-wave transmission loss of 4 dB or less in transmitting radio waves having a frequency of 28 GHz.

7. The radio-wave transmitting substrate according to claim 4, wherein the electroconductive film has a thickness of 1 nm to 100 nm.

8. The radio-wave transmitting substrate according to claim 4, wherein the glass substrate comprises a plurality of glass substrates laminated to each other with a resin film interposed therebetween.

9. The radio-wave transmitting substrate according to claim 4, wherein a β-OH value of the glass substrate is 0.5 mm$^{-1}$ or less measured with a Fourier-transform infrared spectrometer.

10. The radio-wave transmitting substrate according to claim 1, wherein the opening is formed in a plurality such that the plurality of openings is a plurality of parallel lines or a lattice pattern.

11. The radio-wave transmitting substrate according to claim 1, wherein the at least one main surface includes a radio-wave nontransmitting region such that every 1-cm square unit region of the radio-wave nontransmitting region of the at least one main surface satisfies L≤802.6×S−503.7 where L is an overall length in mm/cm$^2$ of a boundary between the heat-ray reflection film and the opening in the unit region, and S is a proportion of the area occupied by the heat-ray reflection film in the unit region.

12. The radio-wave transmitting substrate according to claim 1, wherein the glass substrate is exposed in the opening.

13. The radio-wave transmitting substrate according to claim 1, wherein the dielectric substrate has a radio-wave transmission loss of 4 dB or less in transmitting radio waves having a frequency of 28 GHz.

14. The radio-wave transmitting substrate according to claim 1, wherein the electroconductive film has a thickness of 1 nm to 100 nm.

15. The radio-wave transmitting substrate according to claim 1, wherein the glass substrate comprises a plurality of glass substrates laminated to each other with a resin film interposed therebetween.

16. The radio-wave transmitting substrate according to claim 1, wherein the radio-wave transmitting region satisfies Z>(—Z'—Z'×S'+0.43)/S' where Z is a solar reflectance of the heat-ray reflection film, Z' is a solar reflectance of the opening, and S' is a proportion of the area of the heat-ray reflection film to an area of the radio-wave transmitting region.

17. The radio-wave transmitting substrate according to claim 1, wherein the radio-wave transmitting region satisfies $\Delta E<60.3\times D^{-0.62}-50$ where $\Delta E$ is a color difference between the heat-ray reflection film and the opening, and D is a width in mm of the opening.

18. The radio-wave transmitting substrate according to claim 1, wherein the radio-wave transmitting region satisfies $\Delta E<60.3\times D^{-0.62}-150$ where $\Delta E$ is a color difference between the heat-ray reflection film and the opening, and D is a width in mm of the opening.

19. The radio-wave transmitting substrate according to claim 1, wherein the radio-wave transmitting region satisfies $\Delta E<60.3\times D^{-0.62}-350$ where $\Delta E$ is a color difference between the heat-ray reflection film and the opening, and D is a width in mm of the opening.

20. The radio-wave transmitting substrate according to claim 1, wherein the electroconductive film comprises a plurality of layers.

21. The radio-wave transmitting substrate according to claim 1, wherein a β-OH value of the glass substrate is 0.5 mm$^{-1}$ or less measured with a Fourier-transform infrared spectrometer.

* * * * *